United States Patent
Vuornos et al.

(10) Patent No.: US 10,341,450 B2
(45) Date of Patent: Jul. 2, 2019

(54) CONTENT CUSTOMIZATION BASED ON STATUS WITH NETWORK OPERATOR

(71) Applicant: Facebook, Inc., Menlo Park, CA (US)

(72) Inventors: Lauri Vuornos, Palo Alto, CA (US); Joonas Emil Hjelt, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 165 days.

(21) Appl. No.: 15/403,848

(22) Filed: Jan. 11, 2017

(65) Prior Publication Data

US 2018/0198883 A1   Jul. 12, 2018

(51) Int. Cl.
  *G06F 13/00*   (2006.01)
  *H04L 29/08*   (2006.01)
  *H04W 4/21*   (2018.01)

(52) U.S. Cl.
  CPC ........ *H04L 67/2828* (2013.01); *H04L 67/306* (2013.01); *H04L 67/02* (2013.01); *H04L 67/20* (2013.01); *H04W 4/21* (2018.02)

(58) Field of Classification Search
  CPC ... H04L 67/2828; H04L 67/306; H04L 67/20; H04L 67/02; H04L 67/42; H04W 4/21
  USPC ................ 709/231, 232, 233, 234, 217–222, 709/227–229
  See application file for complete search history.

(56) References Cited

U.S. PATENT DOCUMENTS

| | | | | |
|---|---|---|---|---|
| 7,818,252 B2 * | 10/2010 | Jackowski | ........... | G06Q 20/102 705/35 |
| 9,426,211 B2 * | 8/2016 | Garg | ....................... | H04L 67/10 |
| 2004/0199634 A1 * | 10/2004 | Jackowski | ........... | G06Q 20/102 709/226 |
| 2012/0054349 A1 * | 3/2012 | Chandrasekaran | ..... | H04L 12/56 709/227 |
| 2014/0046856 A1 * | 2/2014 | Kulla | ................... | G06Q 30/012 705/302 |
| 2015/0058449 A1 * | 2/2015 | Garg | ....................... | H04L 67/10 709/219 |

* cited by examiner

*Primary Examiner* — Kenneth R Coulter
(74) *Attorney, Agent, or Firm* — Baker Botts L.L.P.

(57) ABSTRACT

In one embodiment, a method includes a content provider (e.g., a social-media network) receiving an event notification from a network-operator system (e.g., a cellular-service provider) with which a user has a data account. The event notification may include status information associated with the user's data account. The content provider may receive a content request from a client device of the user. Based on the status information associated with the user's data account, the content provider may determine content to transmit to the client device in response to the content requests. The content provider may then transmit the content to the client device through a network associated with the network-operator system.

20 Claims, 5 Drawing Sheets

CONTENT CUSTOMIZATION BASED ON STATUS WITH NETWORK OPERATOR

TECHNICAL FIELD

This disclosure generally relates to systems and methods for customizing content delivery based on, e.g., information provided by network operators.

BACKGROUND

Network operators, such as cellular communication operators, internet service providers, and other data communication operators, provide data communication channels between users and content providers (e.g., social media network, news web site, video streaming web site, email server, app servers, and any other internet-based provider of content). Users typically have accounts or agreements with the network operators servicing them. Such accounts or agreements may place restrictions on data usage, however. For example, a user's data usage may be capped at a certain allowance (e.g., 2 gigabits per month). Exceeding the allowance may trigger certain adverse effects, such as data throttling (e.g., slowing connection speeds to limit bandwidth), hefty financial penalties (e.g., forced purchase of additional data allowances at enhanced rates), or denial of further service. Thus, typical users have to be at least cognizant of his/her data usage to prevent the penalties from being triggered. A user's account status (e.g., data usage, availability, and/or speed) with the network operator changes constantly as the user consumes data through the network and is typically only known to the network operator and sometimes the user.

SUMMARY OF PARTICULAR EMBODIMENTS

The subjected matter described herein enables a content provider to obtain a user's account status information from a network operator so that the content provider may provide customized content that accommodates the user's data usage status. Conventionally, content providers respond to content requests irrespective of the requesting user's data account status with the network through which the content is transmitted. However, the user's data account status may directly impact the user's content viewing preferences. For example, if the user is at risk or has already exceeded his/her data allowance, the user may prefer to receive less media-rich content in order to conserve data usage and not incur penalties. By enabling network operators to send user account information to convent providers, the systems and methods described herein enable the content providers to automatically modify content in the event the users are at risk of or have already exceeded their data allowances. The content providers would therefore be able to help users manage their data consumption. The content provider may implement various data-conservation plans to reduce data consumption, such as by, e.g., reducing the resolution of an image or selecting alternative content that is less media-rich.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein provide network-operator systems capable of sending event-based notifications relating to a user's data-account status to content providers. The types of event notifications may include, e.g., data-plan status, account status, and network status. Notifications may be sent when the user's account status triggers certain rules. For example, a "zero balance" notification may signify that the user has depleted his data allowance; a "data low" notification may signify that the user's data-account balance is nearing depletion; and a "data usage warning" notification may signify that the user's data usage has exceeded his/her historic usage pattern. Notifications may also include other account information, such as data balance in individual or family plan, billing cycle refresh date, signal strength, current data speed, projected data speed (e.g., based on throttling rules or network congestion predictions/assessment), etc. These notifications may be triggered based on predefined rules and pushed to any content provider.

In particular embodiments described herein, content providers may use notifications from network-operator systems to customize outbound content for individual users. For example, if a notification indicates that the user's data allowance/speed is restricted, the content provider may cease transmission, redirect the user to a "free" portal, downgrade media-rich content (e.g., lower resolution video, smaller images, etc.), or cease sending particular content (e.g., advertisements or videos). The content provider may also notify/warn the user of the data restriction, solicit user preference on how data transmission should be tailored while the restriction is in place, and/or suggest a data-plan upgrade.

Figure 1:
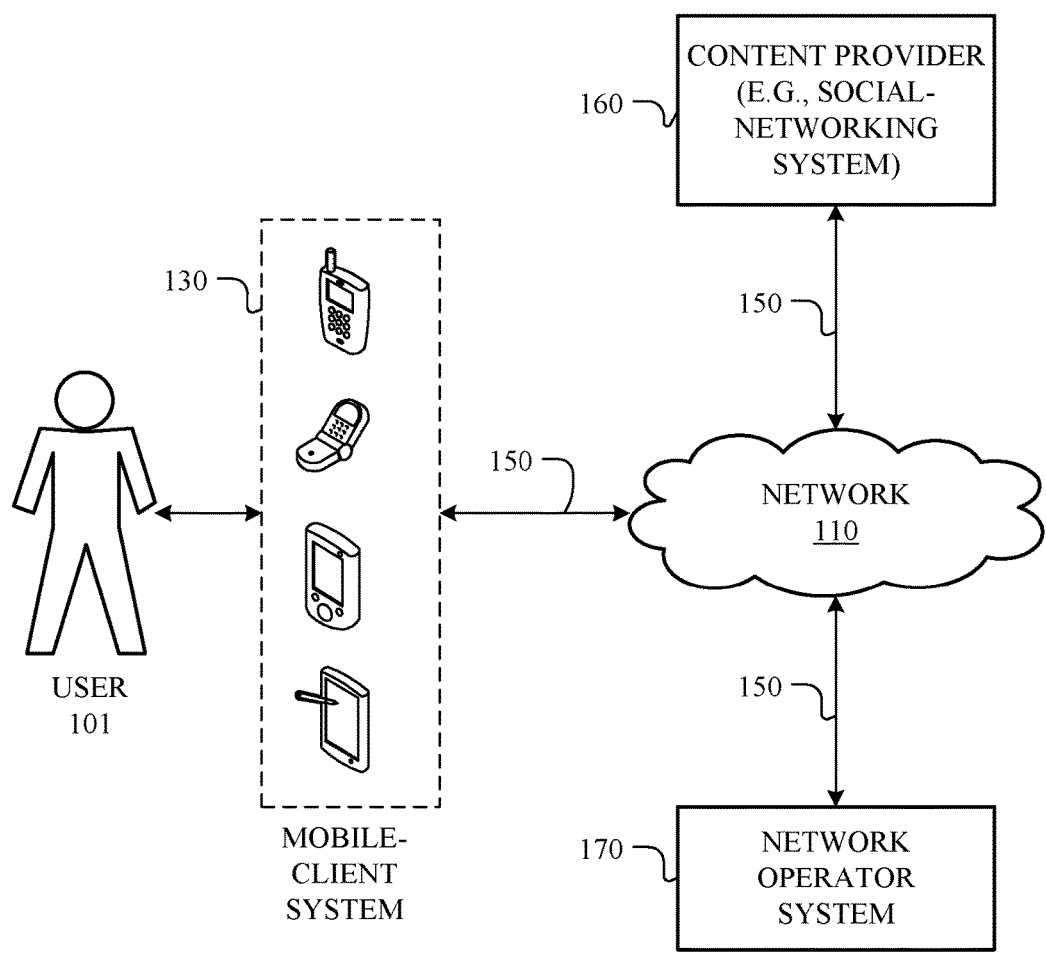
FIG. 1 illustrates an example network environment.

FIG. 1 illustrates an example network environment 100 associated with a content provider (e.g., a social-networking system), network operator, and a user. Network environment 100 includes a user 101, a client system 130, a content provider 160, and a network-operator system 170 connected to each other by a network 110. Although FIG. 1 illustrates a particular arrangement of user 101, client system 130, content provider 160, network-operator system 170, and network 110, this disclosure contemplates any suitable arrangement of user 101, client system 130, content provider 160, network-operator system 170, and network 110. Moreover, although FIG. 1 illustrates a particular number of users 101, client systems 130, content provider 160, network-operator system 170, and networks 110, this disclosure contemplates any suitable number of users 101, client systems 130, content provider 160, network-operator system 170, and networks 110. As an example and not by way of limitation, network environment 100 may include multiple users 101, client system 130, content providers 160, network operators system 170, and networks 110.

In particular embodiments, user 101 may be an individual (human user), an entity (e.g., an enterprise, business, or third-party application), or a group (e.g., of individuals or entities) that interacts or communicates with content provider 160 using a client system 130 (e.g., smarts phone or mobile device, tablet, laptop, desktop computer, or any other communication device). The client system 130 may transmit a content request (e.g., an HTTP request) to the content provider 160 and receive content through network 110, which may be at least partially operated by a network operator associated with network-operator system 170 (e.g., the network operator may be a cellular data operator operating the cellular data network through which the user connects to the Internet). The received content (e.g., webpage, image, picture, audio, text, data, etc.) may be consumed by the client system 130 in any suitable manner and for any suitable purpose (e.g., displayed, processed, saved, etc.).

In particular embodiments, content provider 160 may be a network-addressable computing system hosting an online social network or any other content (e.g., webpage, news, pictures, videos, audio, articles, email, etc.). For example, social-networking system 160 may generate, store, receive, and send social-networking data, such as, for example, user-profile data, concept-profile data, social-graph information, or other suitable data related to the online social network. Content provider 160 may be accessed by the other components of network environment 100 either directly, via network 110, or another network. In particular embodiments, content provider 160 may receive a content request (e.g., an HTTP request) from a client system 130 of a user 101 and respond with appropriate content. Content provider 160 may also push content to the client system 130 unprompted. User 101 may have an account with the content provider, and information associated with the user 101 may be stored and associated with the user's 101 account. In particular embodiments, content provider 160 may have any number of data-conservation plans comprising any number of rules or user preferences for determining how content should be customized or modified depending on, e.g., a user's data-account status with the network operator. In particular embodiments, the data-conservation plans may be defined by the content provider 160, each individual user 101, the network-operator system 170, or any combination of the above. In particular embodiments, a data-conservation plan may be generally applied to content to be transmitted to any user 101 and/or via any network operator's network. In particular embodiments, a data-conservation plan may be applied to content to be transmitted to particular uses 101 and/or via particular network operators' networks. For example, network conservation plans A and B (which may be different) may be selectively applied to content transmitted via network A (e.g., cellular data network) and network B (e.g., a DSL/Cable network) respectively, to the user 101. In particular embodiments, a data-conservation plan may also specify specific actions that the convent provider 160 should undertake in response to specific types of data-account status received from the network-operator system 170. For example, if the data-account status indicates that user 101 has used up his data allowance, the content provider 160 may return only a text snippet of the requested content; if the data-account status indicates that the user's 101 data balance is nearing depletion (but not yet depleted), the content provider 160 may remove all images from the requested content but provide all text (e.g., if a social media news feed is being requested from a social-networking system, only texts of the news feed may be returned without the associated images/videos).

In particular embodiments, network-operator system 170 may be a network-addressable computing system associated with a network operator who provides the user 101 network access the network 110 (e.g., Internet). Network operator may be, e.g., a cellular communication operator, internet service provider, and other data communication operator. The network associated with the network operator may be, e.g., a cellular data network, DSL/Cable network, a Wi-Fi hotspot network, and any other communication network. In particular embodiments, each user 101 of the network may have an account or agreement with the network operator. For example, a cellular data user may have a data service account/agreement with a cellular network operator who operates the data network servicing the user. The same user 101 may also have a separate account/agreement with a DSL ISP network operator who provides Internet access to the user at home. The same user 101 may further have a Wi-Fi hotspot account/agreement with yet another hotspot network operator. In particular embodiments, any of the user's 101 account/agreement may limit the amount of data transmission or speed available to the user 101. In particular embodiments, the limitations may refresh after each plan cycle. For example, a user's 101 cellular plan may have a data allowance of 3 gigabits per month, a DSL plan may throttle data transmission speed once the user exceeds 100 gigabits for the year, and a Wi-Fi hotspot plan may terminate service once the user exhausts a pre-paid amount of data. In particular embodiments, to enforce these restrictions or limits, the network-operator system 170 may track and monitor the user's 101 data-account status information, which may include, e.g., data usage amount in the current plan cycle, data allowance, remaining available data balance, current data transmission speed/class, historic data usage pattern, subscription or promotional eligibility that may cause a different data-accounting rule to be applied (e.g., streaming videos/music on Tuesdays or communication with a particular content provider may not toll a user's data balance for a specified time window), as well as similar data associated with other members within the user's plan (e.g., other family members in a shared family data plan). In particular embodiments, the network-operator system 170 may set various data usage restrictions depending on each user's plan. For example, when a user's data allowance has been exhausted for a given plan cycle, the network-operator system 170 may denied the user further service, and/or charge additional fees for additional data allowance, or throttle data transmission speeds (e.g., switch from 4G LTE speed to 3G speed). As will be described more fully below, the network-operator system 170 in particular embodiments may monitor the user's 101 account status to determine whether certain notification rules have been satisfied, and if so, send notifications relating to the user's account status to the content provider 160.

In particular embodiments, content provider 160 and/or network-operator system 170 may include an authorization server (or other suitable component(s)) that allows users 101 to opt in to or opt out of having their actions logged or shared with other systems, for example, by setting appropriate privacy settings. In particular embodiments, one or more users 101 may use one or more client systems 130 to access, send data to, and receive data from content provider 160 or network-operator system 170. Client system 130 may access content provider 160 or network-operator system 170 directly, via network 110, or via a third-party system. As an example and not by way of limitation, client system 130 may access network-operator system 170 via content provider 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone/data network, or a combination of two or more of these. Network 110 may include one or more networks 110. In particular embodiments, network operator may operate a network that provides user 101 access to the network 110. For example, a network associated with the network operator may be a cellular data network, DSL, Cable, wireless hotspot, and any other suitable network connecting the user 101 and network 110.

Links 150 may connect client system 130, content provider 160, and network-operator system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
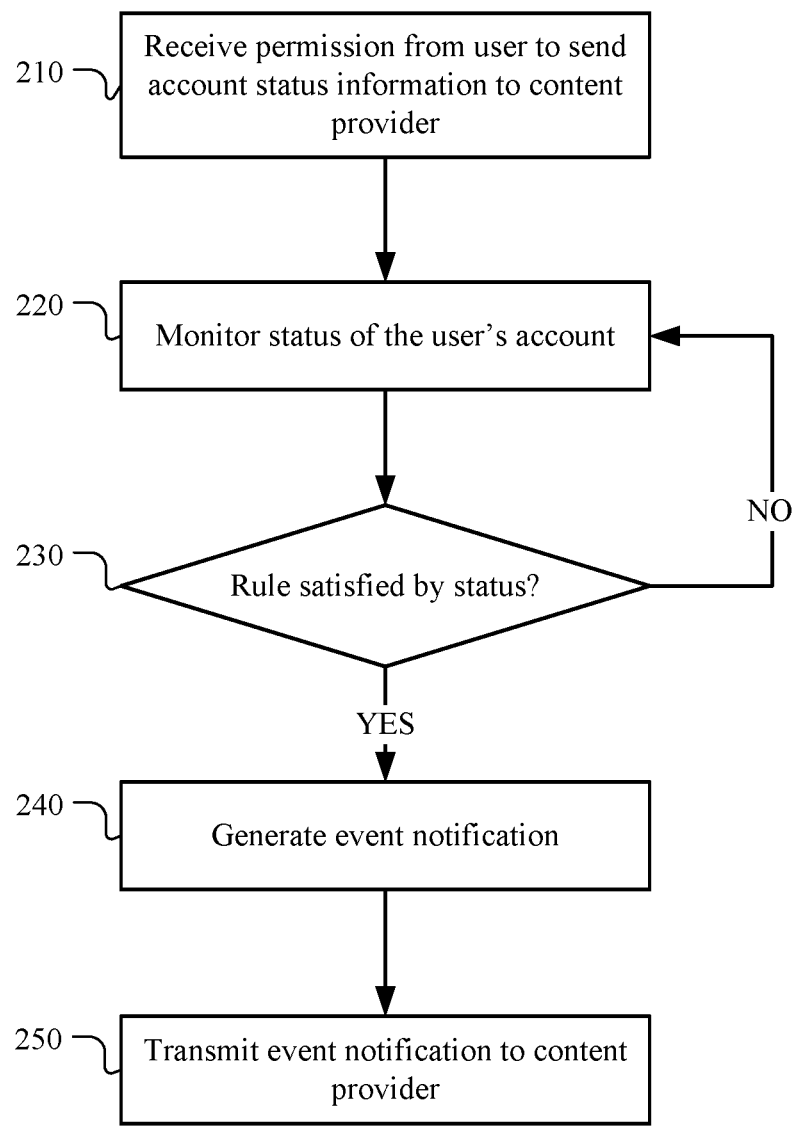
FIG. 2 illustrates an example method for sending a user's data account status from a network-operator system to a content provider.

FIG. 2 illustrates an example method 200 for sending a user's data-account status from a network-operator system to a content provider. The method may begin at step 210, where a network-operator system may receive from a user having a data account with the network-operator system a permission instruction permitting the network-operator system to transmit status information associated with the user's data account to a content provider associated with the user. In particular embodiments, a user may indicate a desire to grant such a permission through a user interface of the content provider. For example, a user of a social-networking website may enable a data-conservation plan, and the social-networking website may redirect the user to a user interface provided by a network-operator system. The content provider may, for example, present the user with a list of network operators to select from or automatically identify the network operator of the user by analyzing the communication signatures from the user (e.g., by analyzing HTTP header information and IP address). Based on the user's selection or automatic identification, the content provider may redirect the user to a predetermined URL of the network-operator system. The user may, in particular embodiments, provide his/her credentials to the network-operator system and, once authenticated, grant the network operator permission to send the user's data-account information to the content provider. In particular embodiments, the user may alternatively navigate directly to the network-operator system's interface to grant such permission. For example, the user may specify that data-account status information is to be sent to a particular content provider (e.g., a social-networking system that the user frequents). As another example, the user may instruct the network-operator system to send data-account information to any content provider from whom the user requests content. In response, the network-operator system may monitor content requests made by the user through the network operated by the network operator to identify potential content providers to which the network-operator system may send status information. In particular embodiments, the network-operator system may further check that the a potential content provider is trust worthy (e.g., as verified by a system administrator) and/or has previously registered with the network-operator system to receive account status information. In particular embodiments, identified target recipients of account status information may be stored and associated with the user's account. In addition, the user may also specify the types of notifications to be sent (e.g., "data low" notification) and/or the triggering criteria (when the user's data-account balance is below 10% of the data allowance).

At step 220, in particular embodiments the network-operator system may monitor a status of the data account of the user. For example, as the user downloads or uploads data using the network associated with the network operator, the resulting data usage may be tolled against the user's data account. Data usage, usage pattern, and other usage data may be stored and associated with the user's account.

In particular embodiments, at step 230, the network-operator system may determine whether a predetermined rule associated with the user's data account is satisfied based on the monitored status of the data account. In particular embodiments, if no rule is satisfied, the monitoring and rule-checking process may repeat until a rule is satisfied, which may trigger a notification to be sent to content providers. In particular embodiments, rules may be checked periodically (e.g., every day, every twelve hours, every hour, every thirty minutes, etc.), whenever the user's data-account status changes (e.g., whenever the user's data balance changes), and/or upon detection of the user communicating with a content provider to whom the network-operator system is permitted to send information. In particular embodiments, a global rule may apply to all users of the network operator. In particular embodiments, a rule may be specific to a particular user, a particular content provider, or a particular user and a particular content provider. Notifications may be triggered when, e.g., data usage approaches data allowance; data balance approaches zero; data allowance has been exceeded or data balance has depleted; data usage approaches the point where data throttling would commence; data throttling has commenced; current data usage has exceeded historic usage pattern (e.g., if the user historically uses 60% of his data by the middle of the plan cycle, a notification may be triggered if his current mid-cycle usage exceeds 60%); current data usage has exceeded prorated data allowance (e.g., more than 50% of the data allowance has been used by the middle of the plan cycle); the rate at which data is being used likely would result in data overages for the current plan cycle (e.g., the average daily use in the last n days, if projected out until the end of the plan cycle, would exceed the user's data allowance); etc. In particular embodiments, notifications may also be triggered when exceptions to normal data accounting is in effect (e.g., exceptions based on promotions, subscriptions, and other triggering events). For example, communications with particular content providers may not toll the user's data allowance. As another example, if an exception to normal data accounting is that data usages on Tuesdays will not toll a user's data allowance, a notification may be sent on Tuesdays to inform the content provider of the free streaming period, and at the end of the day another notification may be sent to indicate that the free-streaming period has ended. Any of these example rules may also apply to a user's family or group data plan. For example, a notification may be triggered if the network operator estimates that the current usage patterns of members of the user's family plan would likely result in data overages for the current plan cycle.

At step 240, in particular embodiments the network-operator system may generate an event notification comprising status information associated with the monitored status. For example, if a rule is triggered because the user's data-account balance has reached zero, the network-operator system may generate an event notification indicating that the user has no more data allowance for the current plan cycle. In particular embodiments, an event notification may include, e.g., a user ID for identifying the user for whom the notification is generated (e.g., the user ID may be the user's account number with the network operator, account number with the content provider, or other identifiers such as the user's email address, phone number, or other uniquely assigned identification). The user ID may be used by the content provider to determine to whom the received even notifications relate. In particular embodiments, a notification may also include a network operator ID for identifying the network operator associated with the notification. The content provider may use the network operator ID to determine which of the user's communications are affected by the notification (e.g., the notification applies to the user's communications through the network operated by the network operator corresponding to the network operator ID). In particular embodiments, the notification may include any number of accounts status information. Account status, in particular embodiments, may be represented by identifiers or codes that both the network operator and content provider understand (e.g., both the network-operator system and content provider may understand that "DE" represents a "data exceeded" status). Examples of account status includes, e.g., "zero balance" when the user depletes his data allowance, current data usage exceeds prorated data allowance, data usage exceeding historic usage patterns, data balance in individual or family plan is low, signal strength (e.g., a weak cellular signal may warrant less media-rich content to be delivered), current data speed, projected data speed (e.g., based on throttling rules, the user device's location, network congestion predictions/assessment, etc.), etc. In particular embodiments, a degree of severity of the user's account status may also be included to give the content provider additional guidance on how to react. For example, a notification reporting that the user is nearing his data allowance may include a percentage indicating how much data is used/available (e.g., 80% used or 20% available). As another example, a prediction (e.g., as a percentage or confidence score) of whether the user would exceed his allowance for the current data plan cycle may be included. In particular embodiments, the content provider may make its own determination on how to react to a notification based on its own data-conservation plan. In particular embodiments, the network-operator system may instruct the content provider on how to react. For example, the network operator may include in its notification that the user has no more data available for the month and may instruct the content provider to send only text for the rest of the user's plan cycle. In particular embodiments, an expiration date or time length may be included in the notification to indicate when the accompanying status information expires and should therefore be disregarded. For example, the expiration date may be the end of the user's data-plan cycle. As another example, the expiration information may inform the content provider that the transmitted status information would remain in effect until updated by a subsequent notification.

In particular embodiments, at step 250 the network-operator system may transmit the event notification to the content provider. Transmission of the event notification may utilize any suitable communication channel, such as the Internet. In particular embodiments, notifications may be pushed to all designated content providers (e.g., those to whom the network operator has permission to send information) when a rule is satisfied. The notifications may be pushed, e.g., periodically (e.g., every hour) or immediately upon triggering of the appropriate rule. In particular embodiments, the status of the user's account is constantly being updated (e.g., whether data allowance is plentiful, low, or zero). When the network operator detects that a user is communicating with a designated content provider, the network operator may push a notification containing the stored status of the user's data account to the content provider. In particular embodiments, the content provider may alternatively pull the network operator for the user's account status information. For example, periodically the content provider may request such information from the network operator to determine whether any data-conservation plan should be in effect. In particular embodiments, the content provider may determine the appropriate content to transmit based on the notification from the network operator, and the determined content may then be transmitted to the user through the network associated with the network-operator system.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for sending a user's data account status from a network-operator system to a content provider, including the particular steps of the method of FIG. 2, this disclosure contemplates any suitable method for sending a user's data-account status including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
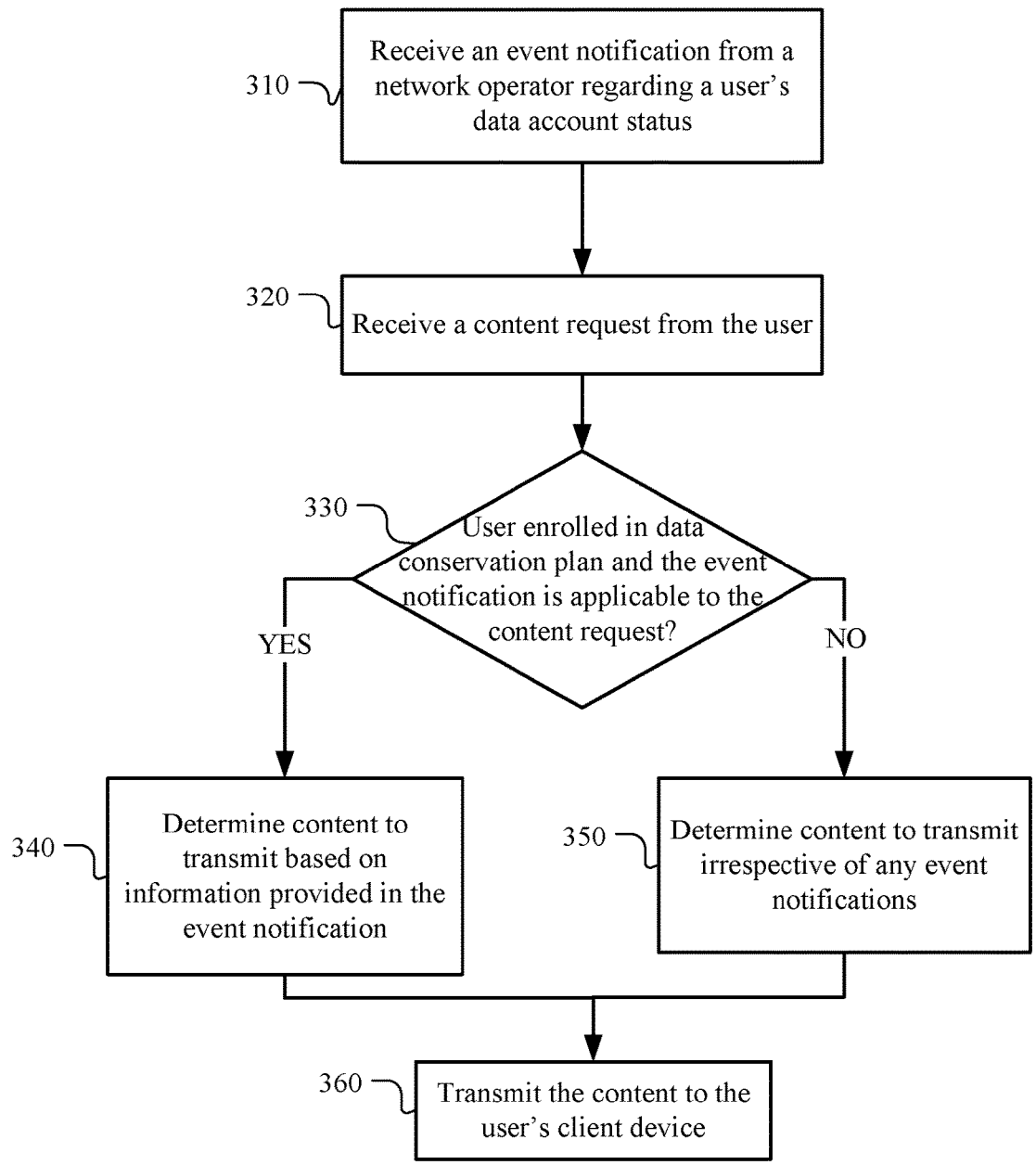
FIG. 3 illustrates an example method for a content provider to determine content to transmit to a user based on the user's data account status.

FIG. 3 illustrates an example method for a content provider to determine content to transmit to a user based on the user's data-account status. In particular embodiments, a user of may enroll in a content provider's (e.g., a social-media network) data-conservation plan. As part of the enrollment, the content provider may be informed of, e.g., identities of the user's network operators, the user's accounts with the network operators, the types of notifications that the network operators may send, or any combination of the above. In particular embodiments, content requested by those who enrolled may, e.g., be customized by the content provider to accommodate the user's data-account status (e.g., whether the user has sufficient data balance). In particular embodiments, unenrolled users my receive content irrespective of their data-account status.

In particular embodiments, the method 300 for determining content to transmit may begin at step 310, where the content provider may receive an event notification from a network-operator system with which a user has a data account, the event notification comprising status information associated with the user's data account. For example, as described above, the user may have a data account with the network-operator system and a predetermined data allowance for a predetermined time period (e.g., 2 gigabits of data per month). The status information in the event notification may include, e.g., an indication that the user's data usage within the predetermined time period is at or exceeds the predetermined data allowance, an indication that the user's data usage within the predetermined time period approaches the predetermined data allowance, or any other relevant status information. As another example, the user's data account with the network-operator system may include a predetermined data transmission speed range and a throttling rule, which may define a condition for reducing the user's typical transmission speed range (e.g., 4G LTE) to a reduced transmission speed range (3G). The status information in this situation may include, e.g., an indication that the condition for reducing the typical transmission speed range is satisfied or close to being satisfied, an indication that the reduced transmission speed range is in effect, or an indication that the typical transmission speed range is no longer available. Status information in the notification may be saved and associated with the user's account with the content provider.

In particular embodiments, the content provider at 320 may receive a content request from a client device of the user. For example, the content request may be an HTTP request for a particular individual's social-media news feed or profile page. At 330, the content provider may, in particular embodiments, determine whether the user is enrolled in any data-conservation plan. For example, if the user is not enrolled in any data-conservation plan, then the content provider may proceed with returning the requested content irrespective of any notifications from the network-operator system. On the other hand, if the user is enrolled in a data-conservation plan, the content provider in particular embodiments may determine whether any event notifications and accompanying data-account status information may be applicable to the requested content. For example, in particular embodiments where content requests from users trigger network operators to send notifications (e.g., a network operator may push notifications upon detection of a user communicating with a content provider), the content provider may assume that any event notification from the network operator's network received substantially concurrent with the user's content request: (1) is still valid or up-to-date and (2) applies to the requested content. In particular embodiments, information contained in an event notification and/or a content request may be used by the content provider to determine which pair of event notification and content request are related (e.g., the event notification may include a request ID associated with the triggering content request). In particular embodiments where event notifications are not triggered by content requests (e.g., the network operator may push notifications periodically or when the user's account status satisfies a rule), the content provider may determine whether any stored event notification information is applicable to the instant content request. For example, the content request may be transmitted through a network (e.g., DSL) different from the network operator's network (e.g., cellular data). As such, in particular embodiments the content provider may identify the network being used to transmit the content request (e.g., by analyzing the HTTP header information, such as the IP address, to determine the ISP or ask the user's device client) to determine whether any stored event notification applies to that network. In particular embodiments, the content provider may also assess whether any stored event notification is stale, and if so the content provider may query the network operator for updated status information. In particular embodiments where event notifications are not pushed but are pulled, the content provider may, upon receiving a content request, identify the relevant network operator and query it for the user's data-account information.

In particular embodiments, the content provider may determine, based on the received status information, content to transmit to the client device in response to the content requests. For example, if it was determined that the user is not enrolled in an applicable data-conservation plan and/or there is no applicable event notification information, the content provider at step 350 may determine the content to transmit irrespective of any event notifications or data-account status information. On the other hand, if it was determined that the user is enrolled in an applicable data-conservation plan and there is applicable event notification information, then at step 340 the content provider may determine content to transmit based on the received data status information. In particular embodiments, content may be determined based on any number of data conservation rules, which may be customized by the user. Examples of data conservation rules include, e.g.: no media (e.g., videos, images, audio) may be transmitted if the available data balance is below a threshold percentage and no content may be transmitted once the balance is 0; data size may be reduced by, e.g., reducing the resolution of images and/or selecting lower resolution videos; content may be reduced by, e.g., limiting news feeds to those from other users within a threshold degree of separation (e.g., 1) of the content-requesting user, omitting images and other media, providing snippets of text, etc.; and/or the returned content may redirect the user to a free portal associated with the network operator through which content may be transmitted without tolling the user's data account. In particular embodiments, the content provider may also notify/warn the user of the data restriction and solicit user preference on how data transmission should be tailored while the restriction is in place. The content provider may also suggest to the user a data plan upgrade. At 360, the content provider may transmit the determined content to the client device through a network associated with the network-operator system. For example, content stripped of images/videos may be transmitted to the requesting user via the user's cellular data network if the user's data allowance is running low.

In particular embodiments, content provider may provide information to the network operators to enhance end-user experience. For example, a social-media network may be able to anticipate a sudden increase in upstream traffic in a particular geographic location (e.g., at a concert) and forewarn the network operator so that the network operator may ensure the desired quality of service. As another example, when content provider is about to stream premium quality content to a user, it may request the content provider to allocate the necessary bandwidth. As a further example, the content provider may request the network operator to increase bandwidth or not toll a user's data account for particular content, such as advertisements, promotional content, or premium content purchased by the user.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determine content to transmit to a user based on the user's data-account status, including the particular steps of the method of FIG. 3, this disclosure contemplates any suitable method for determining content to transmit, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 2.

Figure 4:
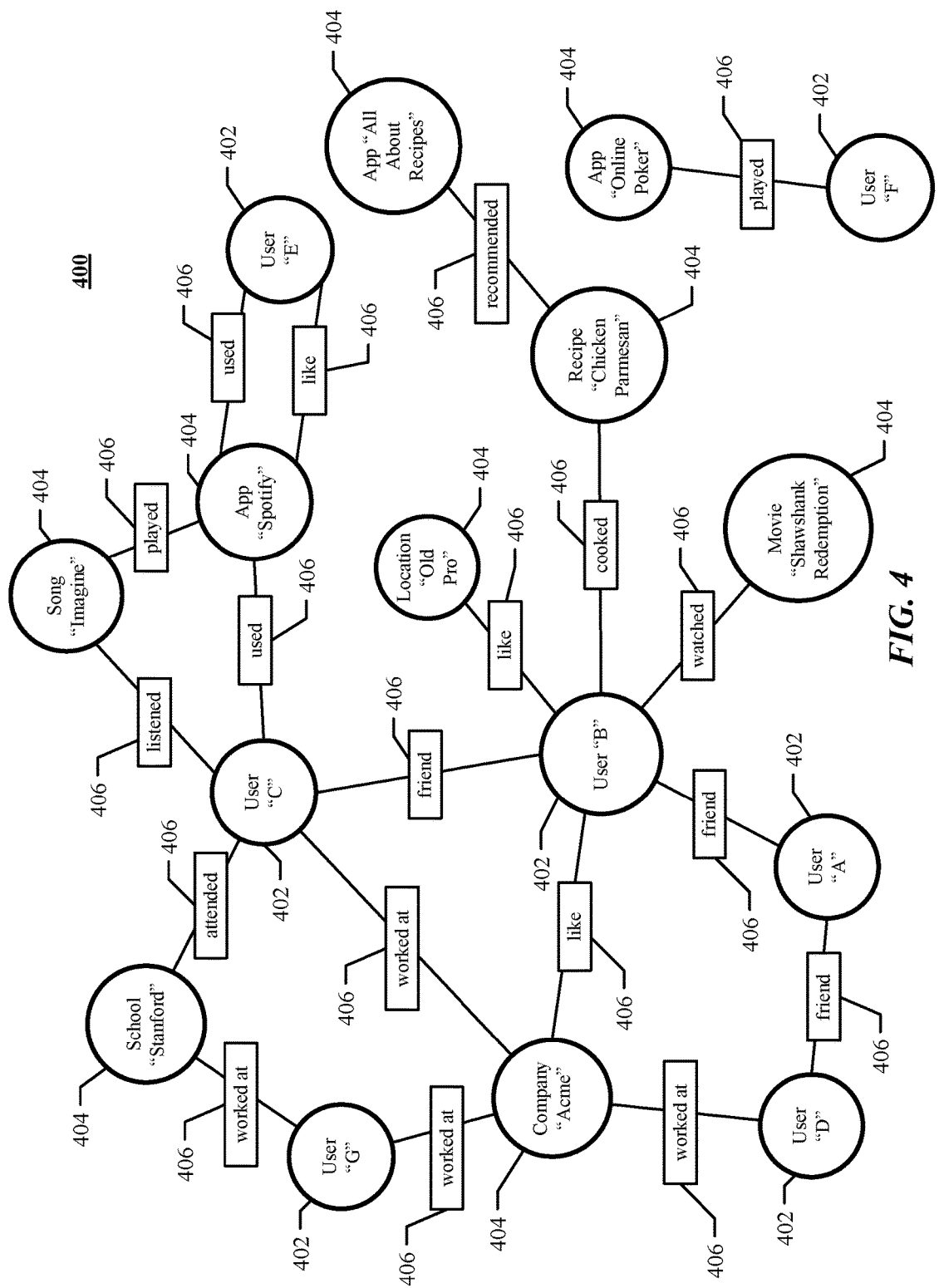
FIG. 4 illustrates an example social graph.

FIG. 4 illustrates example social graph 400. In particular embodiments where a content provider 160 is a social-networking system, social-networking system 160 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 160, client system 130, or third-party system (e.g., network-operator system) 170 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 160. In particular embodiments, a user node 402 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 160. Profile pages may also be hosted on third-party websites associated with a third-party system. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 406 connecting the first user's user node 402 to the second user's user node 402 in social graph 400 and store edge 406 as social-graph information in one or more of data stores 164. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 160 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 160 may create an edge 406 between a user node 402 and a concept node 404 in social graph 400. As an example and not by way of limitation, a user viewing a concept-profile page (such as, for example, by using a web browser or a special-purpose application hosted by the user's client system 130) may indicate that he or she likes the concept represented by the concept node 404 by clicking or selecting a "Like" icon, which may cause the user's client system 130 to send to social-networking system 160 a message indicating the user's liking of the concept associated with the concept-profile page. In response to the message, social-networking system 160 may create an edge 406 between user node 402 associated with the user and concept node 404, as illustrated by "like" edge 406 between the user and concept node 404. In particular embodiments, social-networking system 160 may store an edge 406 in one or more data stores. In particular embodiments, an edge 406 may be automatically formed by social-networking system 160 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
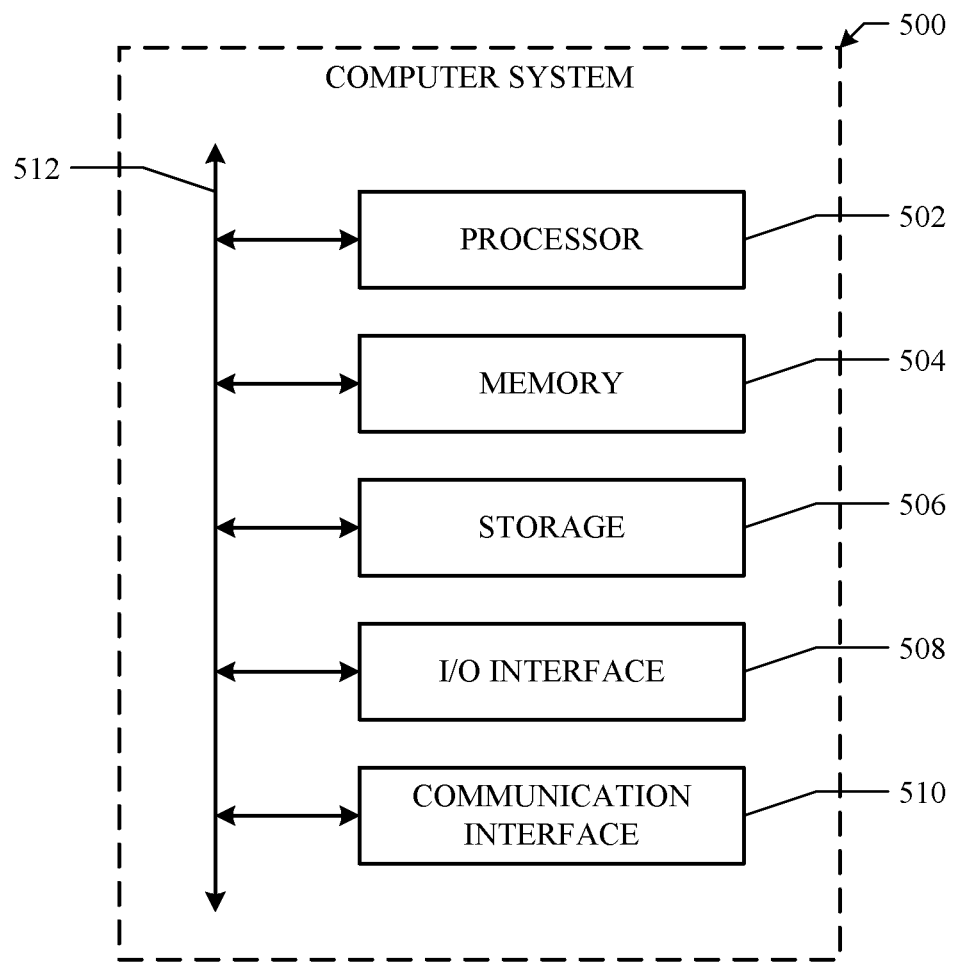
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
receiving, by a processing system of a content provider, an event notification from a network-operator system with which a user has a data account, the event notification comprising status information associated with the user's data account;
receiving, by the processing system of the content provider, a content request from a client device of the user;
determining, by the processing system of the content provider, content to transmit to the client device in response to the content requests;
customizing, by the processing system of the content provider, the content based on the status information associated with the user's data account with the network-operator system; and
transmitting, by the processing system of the content provider, the customized content to the client device through a network associated with the network-operator system.

2. The method of claim 1, further comprising:
receiving, by the processing system of the content provider, a request indicating a desire for content transmitted by the content provider to the user be determined based on status information associated with the user's data account with the network-operator system;
redirecting, by the processing system of the content provider, the user to a user interface of the network-operator system, wherein the user interface is configured to receive permission from the user to transmit status information associated with the user's data account to the content provider.

3. The method of claim 1, wherein the event notification from the network-operator system is pushed to the content provider based on one or more predetermined rules associated the user's data account with the network-operator system.

4. The method of claim 1, wherein the status information relates to at least one of: data allowance, data usage, or data transmission speed available to the user.

5. The method of claim 1,
wherein the user's data account with the network-operator system includes a predetermined data allowance for a predetermined time period; and
wherein the status information comprises at least one of: an indication that the user's data usage within the predetermined time period is at or exceeds the predetermined data allowance, or an indication that the user's data usage within the predetermined time period approaches the predetermined data allowance.

6. The method of claim 1,
wherein the user's data account with the network-operator system includes a predetermined data transmission speed range and a throttling rule, the throttling rule defining a condition for reducing the predetermined transmission speed range to a predetermined reduced transmission speed range; and
wherein the status information comprises at least one of: an indication that the condition for reducing the predetermined transmission speed range is satisfied or close to being satisfied, an indication that the predetermined reduced transmission speed range is available to the user, or an indication that the predetermined transmission speed range is not available to the user.

7. The method of claim 1, wherein the status information comprises a projected data transmission speed available to the user.

8. The method of claim 7, wherein the projected data transmission speed is based on a location of the client device.

9. The method of claim 1, wherein when the status information indicates that a data transmission speed available to the user is restricted or that a data allowance available to the user is below a threshold, the customized content has a reduced data size.

10. The method of claim 1, wherein when the status information indicates that no data allowance or a limited data allowance is available to the user, the customized content is configured to redirect the user to a portal through which data transmission does not toll the data account of the user.

11. The method of claim 1, wherein when the status information indicates that no data allowance or a limited data allowance is available to the user, the customized content is restricted from comprising a video.

12. The method of claim 1, wherein when the information in the event notification indicates that no data allowance or a limited data allowance is available to the user, the customized content is restricted from comprising an advertisement.

13. The method of claim 1, further comprising:
requesting, by the processing system of the content provider, the network-operator system to not toll the data account of the user for transmitting the customized content to the client device.

14. The method of claim 1, further comprising:
requesting, by the processing system of the content provider, the network-operator system to provide faster data transmission speed for transmitting the customized content to the client device.

15. A method, comprising:
receiving, by a processing system of a network-operator system, a permission instruction from a user having a data account with the network-operator system, the permission instruction permitting the network-operator system to transmit status information associated with the user's data account to a content provider associated with the user;
monitoring, by the processing system of the network-operator system, a status of the data account of the user;
determining, by the processing system of the network-operator system, that a predetermined rule associated with the user's data account is satisfied based on the monitored status of the data account;
generating, by the processing system of the network-operator system, an event notification comprising status information associated with the monitored status;
transmitting, by the processing system of the network-operator system, the event notification to the content provider; and
transmitting, through a network associated with the network-operator system, content from the content provider to the user;
wherein the content is (1) requested by the user from the content provider and (2) customized by the content provider based on the status information associated with the user's data account.

16. The method of claim 15, wherein the status information relates to at least one of: data allowance, data usage, or data transmission speed available to the user.

17. One or more computer-readable non-transitory storage media of a content provider embodying software that is operable when executed to:

receive an event notification from a network-operator system with which a user has a data account, the event notification comprising status information associated with the user's data account;

receive a content request from a client device of the user;

determine content to transmit to the client device in response to the content requests;

customize the content based on the status information associated with the user's data account with the network-operator system; and transmit the customized content to the client device through a network associated with the network-operator system.

18. A system of a content provider, comprising: one or more processors; and a memory coupled to the processors comprising instructions executable by the processors, the processors being operable when executing the instructions to:

receive an event notification from a network-operator system with which a user has a data account, the event notification comprising status information associated with the user's data account;

receive a content request from a client device of the user;

determine content to transmit to the client device in response to the content requests;

customize the content based on the status information associated with the user's data account with the network-operator system; and transmit the customized content to the client device through a network associated with the network-operator system.

19. One or more computer-readable non-transitory storage media of a network-operator system embodying software that is operable when executed to:

receive a permission instruction from a user having a data account with the network-operator system, the permission instruction permitting the network-operator system to transmit status information associated with the user's data account to a content provider associated with the user;

monitor a status of the data account of the user;

determine that a predetermined rule associated with the user's data account is satisfied based on the monitored status of the data account;

generate an event notification comprising status information associated with the monitored status;

transmit the event notification to the content provider; and transmit, through a network associated with the network-operator system, content from the content provider to the user;

wherein the content is (1) requested by the user from the content provider and (2) customized by the content provider based on the status information associated with the user's data account.

20. A network-operator system, comprising: one or more processors; and a memory coupled to the processors comprising instructions executable by the processors, the processors being operable when executing the instructions to:

receive a permission instruction from a user having a data account with the network-operator system, the permission instruction permitting the network-operator system to transmit status information associated with the user's data account to a content provider associated with the user;

monitor a status of the data account of the user;

determine that a predetermined rule associated with the user's data account is satisfied based on the monitored status of the data account;

generate an event notification comprising status information associated with the monitored status;

transmit the event notification to the content provider; and transmit, through a network associated with the network-operator system, content from the content provider to the user;

wherein the content is (1) requested by the user from the content provider and (2) customized by the content provider based on the status information associated with the user's data account.

* * * * *